US011263484B2

(12) United States Patent
Keskar

(10) Patent No.: US 11,263,484 B2
(45) Date of Patent: Mar. 1, 2022

(54) SYSTEM AND METHOD FOR SUPERVISED LEARNING-BASED PREDICTION AND CLASSIFICATION ON BLOCKCHAIN

(71) Applicant: Innoplexus AG, Eschborn (DE)

(72) Inventor: Abhijit Keskar, Pune (IN)

(73) Assignee: Innoplexus AG, Eschborn (DE)

( * ) Notice: Subject to any disclaimer, the term of this patent is extended or adjusted under 35 U.S.C. 154(b) by 346 days.

(21) Appl. No.: 16/576,987

(22) Filed: Sep. 20, 2019

(65) Prior Publication Data

US 2020/0110967 A1  Apr. 9, 2020

Related U.S. Application Data

(60) Provisional application No. 62/733,760, filed on Sep. 20, 2018.

(51) Int. Cl.
| | |
|---|---|
| *G06K 9/62* | (2006.01) |
| *H04L 9/32* | (2006.01) |
| *H04L 9/06* | (2006.01) |

(52) U.S. Cl.
CPC ......... *G06K 9/6257* (2013.01); *G06K 9/6264* (2013.01); *H04L 9/0637* (2013.01); *H04L 9/3247* (2013.01); *H04L 2209/56* (2013.01)

(58) Field of Classification Search
CPC .. G06K 9/6257; G06K 9/6264; H04L 9/0637; H04L 9/3247; H04L 2209/56; H04L 9/3239; H04L 2209/38; G06N 20/00; A61B 5/0022; G06F 21/6245
USPC ........................................................ 382/159
See application file for complete search history.

(56) References Cited

U.S. PATENT DOCUMENTS

| | | | | |
|---|---|---|---|---|
| 11,080,624 | B2 * | 8/2021 | Wald | G06Q 10/02 |
| 2013/0152047 | A1 * | 6/2013 | Moorthi | G06F 11/368 |
| | | | | 717/124 |
| 2013/0263169 | A1 * | 10/2013 | Pedlow | H04N 21/4882 |
| | | | | 725/16 |
| 2015/0379430 | A1 * | 12/2015 | Dirac | G06N 20/00 |
| | | | | 706/12 |
| 2016/0071017 | A1 * | 3/2016 | Adjaoute | G06Q 20/4016 |
| | | | | 706/52 |
| 2017/0262862 | A1 * | 9/2017 | Aljawhari | G06F 16/90335 |
| 2018/0046939 | A1 * | 2/2018 | Meron | G06Q 20/405 |
| 2018/0183587 | A1 * | 6/2018 | Won | H04L 9/0891 |
| 2018/0247191 | A1 * | 8/2018 | Katz | G06N 3/006 |
| 2018/0268506 | A1 * | 9/2018 | Wodetzki | G06K 9/628 |
| 2018/0302215 | A1 * | 10/2018 | Salgueiro | H04L 65/403 |

(Continued)

FOREIGN PATENT DOCUMENTS

CN   109194761 A  *  1/2019

*Primary Examiner* — Mahendra R Patel
(74) *Attorney, Agent, or Firm* — Ziegler IP Law Group, LLC

(57) ABSTRACT

Disclosed herein is a system and method for performing on-demand supervised learning-based data analytics directly on blockchain without the need to extract data from the blockchain to an external intermediary platform. The system and method disclosed herein enable supervised learning-based analysis directly on the blockchain, for data records stored on the blockchain. Furthermore, the system and methods disclosed herein allows a training and validation of supervised learning-based algorithms using data records from the transaction blocks of the blockchain without the need of an intermediary platform external to the blockchain.

16 Claims, 4 Drawing Sheets

(56) References Cited

U.S. PATENT DOCUMENTS

2018/0316502 A1* 11/2018 Nadeau ................ H04L 9/0637
2018/0374171 A1* 12/2018 Aizen .................. G06Q 10/107
2019/0019111 A1*  1/2019 Sun .................... G06F 11/3688
2021/0312472 A1* 10/2021 Baskaran ............. G06Q 20/223

* cited by examiner

| Transaction | Transaction type | Added By | Status | Algorithm | Output Location |
|---|---|---|---|---|---|
| Txn 0 | Analysis | 345_inno | Executed | Classification | 4yg67u821hmb |
| Txn 1 | Analysis | 411_innoag | Deferred | - | - |
| Txn 2 | Analysis | 645_innag | Executed | Regression | 3x7f56324gnm |
| Txn 3 | Training | 678_innus | Executed | Classification | ---- |

200

SYSTEM AND METHOD FOR SUPERVISED LEARNING-BASED PREDICTION AND CLASSIFICATION ON BLOCKCHAIN

CROSS REFERENCE TO RELATED APPLICATIONS

This application claims priority to U.S. Provisional Patent Application No. 62/733,760 filed Sep. 20, 2018, which is hereby incorporated by reference in its entirety.

TECHNICAL FIELD

The present application relates generally to the field of information processing and data analytics and particularly to supervised learning-based data analytics solutions on blockchain based platforms. Moreover, the present invention relates to methods and systems for training data records for supervised learning-based data analytics on blockchain based platform.

BACKGROUND

Data Analytics has recently gained significant attention in recent times for solving highly complex problems. Data Analytics primarily includes determination of large-scale data correlations. It includes processing huge amount information for generating useful insights for any business process. Data Analytics allows processing of millions of data records, which is not possible by humane efforts. Moreover, it reduces human biases in delivered insights. Recently, machine learning algorithms such as supervised learning have been used for data analytics wherein such algorithms can automatically analyse huge chunks of data wherein the algorithm first trains itself using labelled data records as training data records and assesses the accuracy of output results using a set of validation data records. Once an accepted level of accuracy is realized, the algorithm is then used for various data analytics solutions such as predictions and/or classification of data records. Supervised learning-based data analytics requires huge amount of data records for training the algorithm. Conventionally, data records are stored and maintained in traditional databases and the abovementioned data analytics solutions including supervised learning are processed by fetching data records from the said traditional databases. These traditional databases and the subsequent supervised learning-based data analytics solutions are customarily executed by an intermediary solution provider, external to the blockchain. Owing to problems associated with such external intermediary-based data processing and analytics solutions such as confidentiality, security and cost, industry has been gradually shifting to blockchain architecture for information processing and management. More and more businesses are using blockchain to decentralize their applications (to make it intermediary free) and as a result more transaction data is being added to the blockchain. While block chain provides extreme levels of security by removing intermediary in data processing, users face problems in data analytics since there is no method, as of now, to directly process and analyse the data present on blockchain. Hence, in return for enhanced security, blockchain restrict the usage of data analytics and therefore, generation of insights from data.

One of the commonly used methods for supervised learning-based data analytics on blockchain is fetching all data records stored in the blocks of the blockchain, storing the fetched data records on external intermediary platform and processing the same on a separate database, external to the blockchain platform, for the purpose of training the algorithm and then using the algorithm to predict and classify data records.

The abovementioned method of data analysis of data records stored on a blockchain results in large amount of data exchange with the intermediary platform which is time consuming and inefficient. Further, such method of data extraction from the blocks of the blockchain platform for data analysis is against the spirit of blockchain which strives to make information processing and management intermediary free. In the solution mentioned above, the external intermediary platform used for data analysis eliminates all advantages associated with a blockchain.

In light of the above-mentioned shortcomings associated with existing data analysis method and systems for supervised learning-based analysis of data records stored on blockchain, it is highly desirable to have a system and method that allows supervised learning-based data analytics directly on the blockchain. The present invention, as described below, allows a user to perform data analytics directly on the blockchain where the data records are stored in transaction blocks without the need for extracting data records from the blockchain, and storing the said data records on an external intermediary platform for further processing.

SUMMARY

Embodiments of the present disclosure present technological improvements as solutions to one or more of the above-mentioned technical problems recognized by the inventor in conventional systems.

In an aspect of the present invention, a system and method for enabling, on a blockchain, supervised learning-based data analytics of data records stored on the blockchain is provided.

In another aspect, a system and method for enabling, on a blockchain, training of supervised learning-based algorithm from data records stored on the blockchain is provided.

In yet another aspect of the present invention, a system and method for enabling, on a blockchain, user customized supervised learning-based analysis of data records stored on the blockchain is provided.

In another aspect, a system and method for retrieving data analytics insights, directly from a blockchain, for data records stored on the blockchain without extracting data records to an external intermediary platform is provided.

In yet another aspect, a system and method for enabling, on a blockchain, data analytics using data records stored on an off-chain data storage medium controlled by the blockchain is provided.

Beneficially, the present invention provides a system for performing data analytics on a blockchain communicably coupled to a server arrangement via one or more data communication network wherein the blockchain is configured to:

receive an analysis transaction wherein the analysis transaction comprises information pertaining to at least one data record and a data processing method name;

trigger a standard smart contract method to determine if the supervised learning-based algorithm associated with the data processing method name is suitably trained;

execute, based on the successful determination of supervised learning-based algorithm being suitably trained, the analysis transaction wherein the execution of the analysis transaction comprises invoking at least one smart contract method wherein the smart contract method, when executed, implements the data processing algorithm on the data record;

return an output generated from implementation of the supervised learning-based algorithm on the data record.

In yet another aspect, the present invention provides a method for performing data analytics on a blockchain communicably coupled to a server arrangement via one or more data communication network, the method comprising:

receiving, by the blockchain, an analysis transaction wherein the analysis transaction comprises information pertaining to at least one data record and a data processing method name;

triggering, on the blockchain, a standard smart contract method to determine if the supervised learning-based algorithm associated with the data processing method name is suitably trained;

executing, based on the successful determination of supervised learning-based algorithm being suitably trained, the analysis transaction wherein executing the analysis transaction comprises invoking at least one smart contract method wherein the smart contract method, when executed, implements the data processing algorithm on the data record;

returning an output generated from implementation of the supervised learning-based algorithm on the data record.

Further, in another aspect, the present invention provides a system for training one or more supervised learning-based algorithms on a blockchain communicably coupled to a server arrangement via one or more data communication network wherein the blockchain is configured to:

receive a training transaction wherein the training transaction comprises at least one labelled data record, and information pertaining to a supervised learning-based algorithm;

execute the training transaction wherein the execution of the training transaction comprises:

invoking at least one smart contract method wherein the smart contract method, when executed, initializes a training of the supervised learning-based algorithm on the set of data records;

determining a present value of precision and recall for the supervised learning-based algorithm;

updating an entry corresponding to the supervised learning-based algorithm in an index table with the present value of precision and recall.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the below-mentioned detailed description and drawings.

OBJECT OF INVENTION

An object of the invention is to enable supervised learning-based data analytics directly on the blockchain, without the need of fetching data records outside the blockchain.

Another object of the invention is to enable implementation of supervised learning algorithms on blockchain without the need of fetching data records outside the blockchain.

Another object of the invention is to enable training of custom supervised-learning algorithms directly on a blockchain without the need of fetching data records outside the blockchain.

BRIEF DESCRIPTION OF DRAWINGS

The summary above, as well as the following detailed description of illustrative embodiments are better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
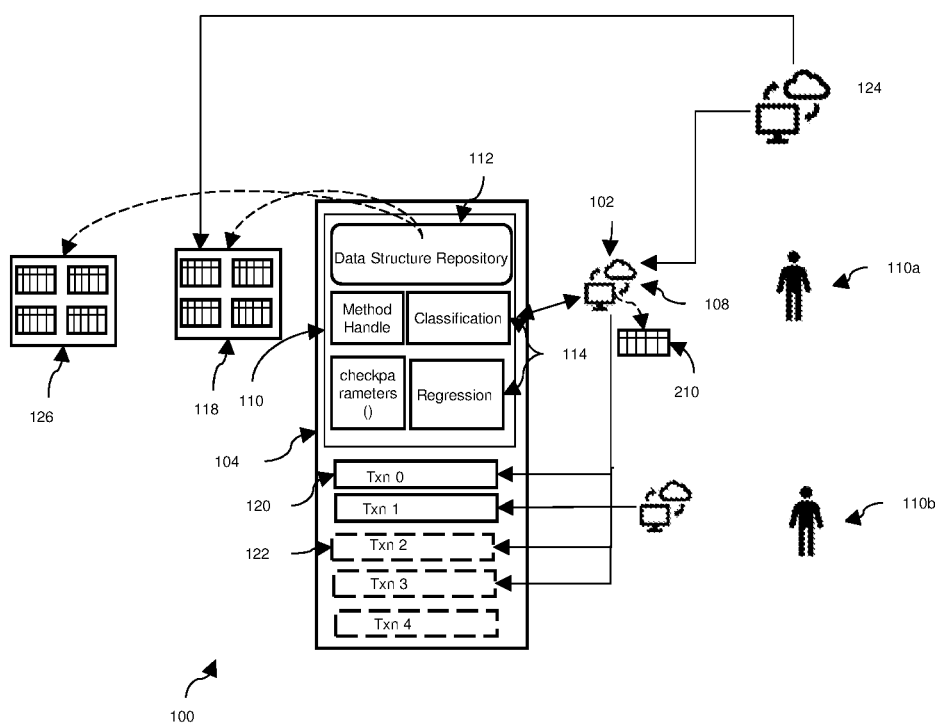
FIG. 1 is a schematic illustration of the system for performing on-demand supervised-learning based data analytics on the blockchain according to an exemplary embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the nonunderlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data. Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Additional modules can be included without deviating from the novel art of this disclosure. In addition, each module can include any number and combination of sub-modules, and systems, implemented with any combination of hardware and/or software modules.

Method steps of the invention may be performed by one or more computer processors executing a program tangibly embodied on a computer-readable medium to perform functions of the invention by operating on input and generating output. Suitable processors include, by way of example, both general and special purpose microprocessors. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer executable instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer executable instructions for carrying out a plurality of operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. The computer readable program instructions may execute entirely on the user's computer, partly on the user's computer, as a stand-alone software package, partly on the user's computer and partly on a remote computer or entirely on the remote computer or server. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The present invention claims a system and method for enabling, on a blockchain, real-time supervised learning-based data analysis of data records and fetching the insights from the blockchain. Throughout this disclosure, the term "insights" refers to information obtained from processing of data records resulting in classification of data records, identification of data trends, patterns and behaviour. Similarly, the term "data analytics" refers to various data processing algorithms executed on data records for supervised learning-based analysis of data records. As a non-limiting example of such supervised learning-based data analytics are classification, prediction, linear regression, deep learning etc. It shall be appreciated that data analytics inherently results in generation of insights and hence data analytics is a precursor to insights generation from data records. Furthermore, the term "data records" refers to information stored in the blocks of the blockchain platform and includes financial data, sales data, medical data, etc. Throughout the present disclosure, the term "consumer" relates to any organization and/or individual that desires to use the insights and data analytics generated on the blockchain.

Beneficially, the data records are converted to a predefined format before addition of the data records to the blockchain. In an embodiment of the present invention, the data records are stored in json format.

Figure 2:
FIG. 2 depicts a status index as per the present disclosure.

FIG. 1 depicts an exemplary embodiment wherein the system 100 comprises a server arrangement 102 coupled to a blockchain 104 and one or more consumers 110a, 110b . . . . Each consumer is enabled to interact with the system 100 via a user interface 106 associated with a client device 108. The blockchain 104 can be a public blockchain or a private blockchain. Optionally, the blockchain could be permissionless or permissioned. The blockchain 104 is configured to include an initial smart contract 110 wherein the initial smart contract comprises at least one data structure repository 112. The initial smart contract 110 further comprises one or more data processing methods 114 with pre-configured permissions. Each of the data processing methods 114 is a smart contract method that, when invoked, implements at least one supervised learning-based algorithm on one or more data records within the data structure repository 112 of the initial smart contract 110. The blockchain 104 is further operable to maintain a list of available data processing methods and their corresponding arguments through Application Binary Interface (ABI). Further, the initial smart contract 110 comprises a status index 118 of one or more transactions added to the blockchain 104 wherein each of the one or more transactions of the status index are mapped against a type of transaction, data processing method, added by consumer id, an execution status and an output. FIG. 2 depicts a status index 118 as per the exemplary embodiment.

The initial smart contract 110 further comprises one or more standard smart contract methods with pre-configured permissions wherein each of the standard smart contract methods is method that, when called, implements a predetermined function.

Throughout this disclosure, the term "initial smart contract" refers to a preconfigured smart contract appended to a blockchain and includes a set of object definitions that are created automatically at the time of deployment of the preconfigured smart contract. The initial smart contract is an essential element for the blockchain communicably coupled to the data requester and the data provider. Any blockchain as per the disclosed system must be deployed said initial smart contract. The term "smart contract method" refers to set of codes which are used to interrogate a smart contract or change its state. A smart contract can have more than one smart contract methods within it, based on the desired output. The term "data structure repository" refers to an organized collection of data elements stored inside the smart contract on a blockchain. These data elements can have different types and different lengths. The said data structure repositories can be either linear data structures or hierarchical. As a non-limiting example of such data structure repository, as used in one of the embodiments of the present disclosure, are linked lists and arrays with data elements being stored in the data structure repository in key-value pair format. Furthermore, the term "off-chain data storage medium" refers to any storage of data records which isn't stored on a blockchain. An example of such off-chain storage medium is Enigma, Swarm etc. The blockchain, in such cases, reads the data from third party solutions such as Oracle.

The server arrangement 102 is operable to enable a consumer to add one or more input transactions to the blockchain 104 wherein the one or more input transaction comprises at least one data record stored in a predefined format. The one or more input transactions are added by the consumer through a web-based application or mobile based application communicably coupled to the server arrangement. In an alternate embodiment, third party extensions on the server arrangement 102 allowing addition of the one or more input transactions to the blockchain 104 are used. Optionally, the at least one data record may be stored in an off-chain storage medium, external to the blockchain, controlled by the blockchain. The at least one data record stored in the off-chain storage medium is converted to a format accepted by the blockchain and can be efficiently fetched by the blockchain on the fly.

The term "server arrangement" refers to an arrangement of one or more servers that includes one or more processors configured to perform various operations, for example, as mentioned earlier. Optionally, the server arrangement includes any arrangement of physical or virtual computational entities capable of performing the various operations. The term "one or more processors" may refer to one or more individual processors, processing devices and various elements associated with a processing device that may be shared by other processing devices. Additionally, the one or more individual processors, processing devices and elements are arranged in various architectures for responding to and processing the instructions that drive the aforesaid system.

Moreover, it will be appreciated that the server arrangement can be implemented by way of a single hardware server. The server arrangement can alternatively be implemented by way of a plurality of hardware servers operating in a parallel or distributed architecture. As an example, the server arrangement may include components such as a memory unit, a processor, a network adapter, and the like, to store and process information pertaining to the document and to communicate the processed information to other computing components, for example, such as a client device. Furthermore, the server arrangement comprises a database arrangement for storing data therein.

The term "user interface" refers to a graphical user interface unit or a command line interface which enables a user to access information stored on the blockchain and/or to store information on the blockchain. Further, the user interface is configured to receive one or more inputs from a user.

As per a preferred embodiment of the present invention, the system 100 provides for supervised learning-based classification and prediction of data records on a blockchain 104. The initial smart contract 110 of the blockchain 104 comprises a plurality of data processing methods wherein each of the data processing methods, when executed, implements a supervised learning-based algorithm. Said supervised learning-based algorithms included within the data processing methods are preconfigured with required initial set-up such as feature engineering, learning rate, overfitting/bias adjustment, training set size (training threshold), validation set size, etc. Furthermore, each of the supervised learning-based algorithm is associated with a desirable precision and recall value.

In an alternate embodiment, one or more supervised learning-based algorithms, along with their respective code script and required configuration parameters, is passed along-with a custom transaction. This enables addition of new algorithms, on the fly, since the pre-configured data processing methods within the initial smart contract 110 might contain older version of algorithms. Further, the initial smart contract 110 may not have access to new algorithms and passing scripts for algorithm along-with the custom transaction results in implementation of latest algorithm on the set of data records, as per need of the consumer. As per the alternate embodiment, the custom transaction can be customized by the user to include custom algorithms for data analytics. Each supervised learning-based algorithm added by means of custom transaction contains details as mentioned in the foregoing paragraphs such as feature engineering, learning rate, overfitting/bias adjustment, training set size (training threshold), validation set size, a desirable precision and recall value etc. Further, the user can add one or more custom transactions such as Custom Txn 1, Custom Txn 2 and so on. Further, in another aspect, the blockchain 104 comprises a native processing block that enables processing of supervised learning-based algorithms in different programming languages.

An index table 126 on the blockchain 104 provides a list of the available data processing methods within the initial smart contract 110 with each entry of the index table 126 corresponding to a distinct data processing method. Each entry of the index table comprises information pertaining to a supervised learning-based algorithm included in the data processing method, a desirable value of precision and recall for the supervised learning-based algorithm, and a present value of precision and recall for the supervised learning-based algorithm. In case of addition of a new data processing method to the initial smart contract 110, a new entry corresponding to the new data processing method is created in the index table 126 and populated with above-mentioned relevant details.

A standard smart contract method checkparameters( ) available within the initial smart contract 110 of the blockchain 104 is operable to check if the supervised learning-based algorithm included within the data processing method is suitably trained. The checkparameters( ) method is provided with a data processing method name as the input argument. The checkparameters( ) method, when invoked, looks up the index table 126 for entry corresponding to the data processing method. Subsequently, the checkparameters( ) method compares the present and desired values of precision and recall for said supervised learning-based algorithm included in the data processing method determines if the supervised learning-based algorithm included within the data processing method is suitably trained. If the present value of precision and recall is lesser than the desired value of precision and recall, the supervised learning-based algorithm is determined as not suitably trained. Alternatively, if the present value of precision and recall is equal or greater than the desired value of precision and recall, the supervised learning-based algorithm is determined as suitably trained.

It shall be appreciated by persons skilled in the art that the standard smart contract method checkparameters( ) is just a nomenclature for the said standard smart contract method and is used for the purpose of describing the embodiment. In essence, a method, with any nomenclature, configured to look up values from within a table stored inside a smart contract shall suffice the purposes of checkparameters( ) standard method.

The system 100 enables supervised learning-based data analytics on the at least one data record by means of an analysis transaction 120 added to the blockchain, on the fly, by the consumer wherein the analysis transaction comprises information pertaining to at least one data record and a data processing method name. The analysis transaction 120 has preconfigured permission to access the initial smart contract 110 and is operable to invoke the data processing method within the initial smart contract 110. Further, the analysis transaction 120 comprises of one or more parameters required for the data processing method being invoked, on the initial smart contract 110. In an embodiment, the information pertaining to data record comprises of a data record on which the supervised learning-based algorithm is to be implemented. Alternatively, the data record on which the supervised learning-based algorithm is to be implemented can be fetched from the data structure repository of the initial smart contract 110 and the information pertaining to data record comprises the location of said data structure repository. Alternatively, optionally, the data record can be fetched from a distributed storage system, such as IPFS, communicably coupled to the blockchain 104. Furthermore, the analysis transaction has preconfigured permissions to invoke checkparameters( ) method wherein the checkparameters( ) method checks if the supervised learning-based algorithm is suitably trained for outputting a result with desirable precision and recall. Based on a successful response from the checkparameters( ) method, the analysis transaction 120 is executed to implement the supervised learning-based algorithm on data record to provide an output.

In case of unsuccessful response from the checkparameters( ) method, the analysis transaction is executed without producing any output. In such case of the analysis transaction 120 being executed without an output due to lack of training, resulting in poor precision and recall, the entry corresponding to the said analysis transaction 120 in the status index 118 is updated to reflect the requirement of training for supervised learning-based algorithm included in the data processing method invoked by the analysis transaction 120.

In an aspect of the present invention, the system comprises a continuous listener module 124 wherein the continuous listener module 124 is operable to continuously track the status index 118. For cases of analysis transaction being executed without output owing to lack of training data records for a supervised learning-based algorithm, the continuous listener module 124 is operable to notify a consumer or an owner of the said supervised learning-based algorithm about further requirements of labelled data records for training and validation.

Figure 3:
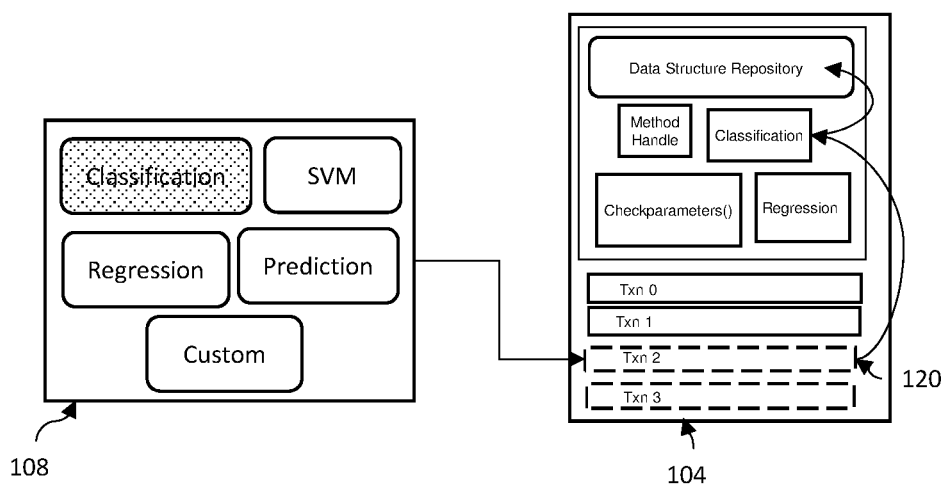
FIG. 3 depicts the system with the user interface for adding one or more analysis transaction for performing data analytics.

FIG. 3 depicts a preferred embodiment of the present invention, wherein a consumer intends to implement supervised learning-based algorithm on one or more data records. The system 100 provides a plurality of standard analysis transactions with pre-configured permissions to invoke at least one pre-defined algorithm such as classification, prediction, SVM, regression etc for data analytics. A consumer, via the user interface 108, can select one or more standard analysis transaction for performing data analytics on the one or more data records. Further, the analysis transaction 120 has pre-configured permissions to fetch the one or more data records from the data structure repository 112 of the initial smart contract 110. Alternatively, the one or more data records is passed along with the analysis transaction 120. Optionally, the one or more data records can be read, by the initial smart contract 110, from an address location passed along-with the analysis transaction 120. The analysis transaction 120 is executed, relevant data processing method is invoked, corresponding supervised learning-based algorithm is implemented, and the generated insights and output is returned by the analysis transaction 120.

Optionally, in case of undesirable results, the analysis transaction 120 is paused and the configuration parameters for the one or more supervised learning-based algorithm is altered. The analysis transaction 120 is then again executed, after alteration of configuration parameters of the desired algorithm, in order to achieve the correct data analytics insights. In an aspect of the present invention, the system enables pre-processing of the set of data records prior to implementation of the supervised learning-based algorithm.

The output of data processing method 114 implemented on the one or more data records is written to the analysis transaction 120 and is finally transmitted to the consumer in form of the consumer fetching the output from the analysis transaction. Optionally, the output is written into a memory location of the data structure repository 112 of the initial smart contract 110 of the blockchain 104 and an address pertaining to the said memory location within the data structure repository 112 is updated against the entry corresponding to the analysis transaction 120 in the status index 118. The said memory location is written to the analysis transaction 120, which is fetched by the consumer. The output may be fetched, subsequently, by adding a transaction with preconfigured permissions to access the memory location in the data structure repository 112, the said memory location being passed along with the transaction. Alternatively, the output may be fetched using the API exposed by the blockchain 104.

Figure 4:
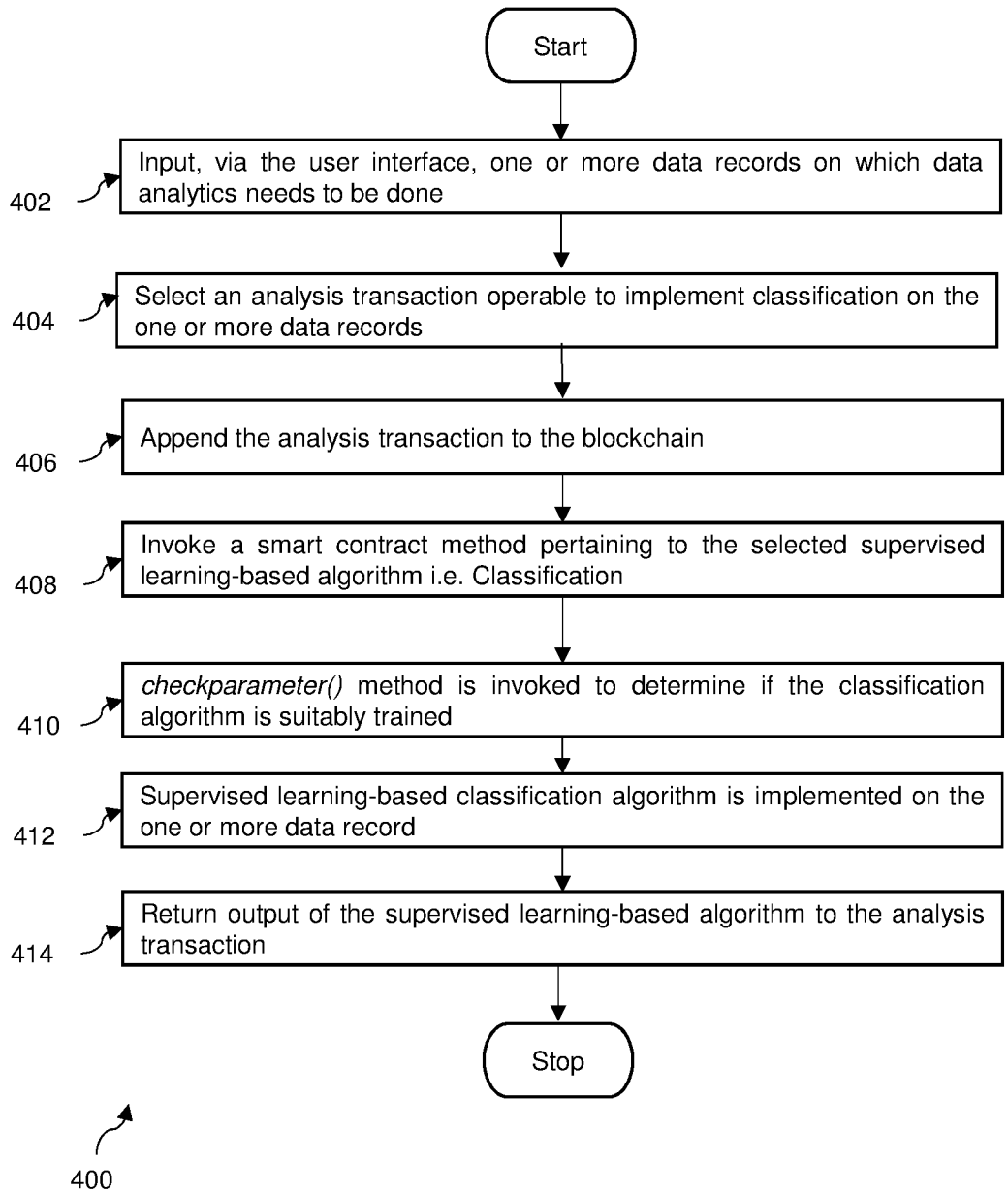
FIG. 4 depicts a flowchart describing the method steps in implementing supervised learning-based data analytics directly on the blockchain as per the present disclosure.

In an example embodiment of the present invention as per the method steps depicted in FIG. 4, at step 402 the consumer inputs, via the user interface, one or more data records on which data analytics needs to be done. As described in the foregoing paragraphs, the one or more data records can be either selected from within the blockchain or passed along with an analysis transaction. Further, at step 404, the consumer selects an analysis transaction operable to implement classification on the one or more data records. At step 406, said action results, in an analysis transaction being appended to the blockchain 104 wherein the analysis transaction has preconfigured permissions to invoke, at step 408, a smart contract method that when executed implements a classification algorithm, within the initial smart contract 110 of the blockchain 104. At step 410, checkparameter( ) method is invoked to determine if the classification algorithm is suitably trained. Based on a successful response from the checkparameters( )method, at step 412, the supervised learning-based classification algorithm is implemented on the one or more data record. At step 414, the output is returned to the analysis transaction or stored in a memory location, to be retrieved later.

In another embodiment of the present invention, the system 100 provides a method and system for training a supervised learning algorithm directly on the blockchain 104 using a set of data records stored within the data structure repository 112 in the initial smart contract 110. Each data processing method within the initial smart contract 110 is associated with a corresponding training repository 118 within the data structure repository 112 wherein the training repository 128 is operable to store a set of labelled training data records required for training a supervised learning-based algorithm of the data processing method associated with the said training repository. Optionally, the training repository 128 further contains a set of validation data records which are used to validate the data processing algorithm against a desirable precision and recall inputted for a supervised learning-based algorithm included within a data processing method. Further, whenever a new data processing method is added, by means of a custom transaction, to the initial smart contract 110, a training repository 128 within the data structure repository 112 is created wherein the training repository contains the set of labelled training data records required for training of the supervised learning-based algorithm included in the data processing method added by the custom transaction.

In operation, one or more user can add a training transaction to the blockchain 104 wherein the training transaction comprises at least one data record in a predefined format. Preferably, the at least one data record added through the training transaction is a labelled data record used for training a supervised learning-based algorithm and in form input-output expressions form. The training transaction has preconfigured permissions to initialize a training of the supervised learning-based algorithm using the labelled data record. After every instance of training, a present value of precision and recall is updated in the index table 126. Further, the labelled data record is stored in the training repository 118.

In another embodiment, the consumer can select, via the user interface, a set of data records, located on a given memory location, to be used as labelled training data set. In yet another embodiment, the labelled training data records are stored on an off-chain storage medium which are controlled by the blockchain 104. The said labelled training data records are stored in a pre-defined format readable by the blockchain. At the time of execution of the training transaction, the labelled training data records are accessed, by the blockchain, via demux feature through which the off-chain storage medium is accessed and controlled by the blockchain 104.

It shall be appreciated by person skilled in the art that the terms "input transaction", "analysis transaction", and "training transaction" are used for naming purposes for better clarity and understanding of the disclosed invention and refer to a transaction added for adding data records, for implementing a data processing algorithm, and for adding labelled data records respectively. In substance, the input transaction, analysis transaction, and training transactions are ascribed the same meaning as is prevalent in the industry in context of a transaction added to the blockchain.

Any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

The description, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. At least portions of the functionalities or processes described herein can be implemented in suitable computer-executable instructions.

It will be appreciated that features of the present disclosure are susceptible to being combined in various combinations and additional features may be introduced without departing from the scope of the present disclosure.

I claim:

1. A system for performing data analytics on a blockchain communicably coupled to a server arrangement via one or more data communication network wherein the blockchain is configured to:
   receive an analysis transaction wherein the analysis transaction comprises information pertaining to at least one data record and a data processing method name;
   trigger a standard smart contract method to determine if the supervised learning-based algorithm associated with the data processing method name is suitably trained, wherein the standard smart contract method determines a suitably trained supervised learning-based algorithm based on an index table wherein the index table comprises information pertaining to a desired value of precision and recall, and a present value of precision and recall for each supervised learning-based algorithm available on the blockchain;
   execute, based on the successful determination of a supervised learning-based algorithm being suitably trained, the analysis transaction wherein the execution of the analysis transaction comprises invoking at least one smart contract method wherein the smart contract method, when executed, implements the data processing algorithm on the data record;
   return an output generated from implementation of the supervised learning-based algorithm on the data record.

2. The system of claim 1 wherein the blockchain comprises an initial smart contract that further comprises a plurality of smart contract methods, each smart contract method configured to implement at least one supervised-learning based algorithm on one or more data records.

3. The system of claim 1, wherein the analysis transaction is selected, by a consumer via the user interface, out of a set of available standard analysis transactions and wherein each of the standard analysis transaction corresponds to at least one supervised learning-based data processing algorithm.

4. The system of claim 2 wherein the analysis transaction comprises a custom supervised learning-based algorithm, not previously present on the initial smart contract of the blockchain, and wherein a code script for and one or more configuration parameters for a custom supervised learning-based algorithm is passed along-with the analysis transaction appended to the blockchain.

5. The system of claim 1, wherein the information pertaining to the data record comprises the data record.

6. The system of claim 2, wherein the information pertaining to the data record includes a memory location within a data structure repository within the initial smart contract on the blockchain.

7. A method for performing data analytics on a blockchain communicably coupled to a server arrangement via one or more data communication networks, the method comprising:
receiving, by the blockchain, an analysis transaction wherein the analysis transaction comprises information pertaining to at least one data record and a data processing method name;
triggering, on the blockchain, a standard smart contract method to determine if a supervised learning-based algorithm associated with the data processing method name is suitably trained, wherein the standard smart contract method determines a suitably trained supervised learning-based algorithm based on an index table wherein the index table comprises information pertaining to a desired value of precision and recall, and a present value of precision and recall for each supervised learning-based algorithm available on the blockchain;
executing, based on the successful determination of a supervised learning-based algorithm being suitably trained, the analysis transaction wherein executing the analysis transaction comprises invoking at least one smart contract method wherein the smart contract method, when executed, implements a data processing algorithm on the data record;
returning an output generated from implementation of the supervised learning-based algorithm on the data record.

8. The method of claim 7, wherein the blockchain comprises an initial smart contract that further comprises a plurality of smart contract methods for implementing one or more supervised-learning based algorithms on one or more data records.

9. The method of claim 7, wherein the analysis transaction is selected, by a consumer via the user interface, out of a set of available standard analysis transactions and wherein each of the standard analysis transaction corresponds to at least one supervised learning-based data processing algorithm.

10. The method of claim 8 wherein the analysis transaction comprises a custom supervised learning-based algorithm, not previously present on the initial smart contract of the blockchain, and wherein a code script for and one or more configuration parameters for the custom supervised learning-based algorithm is passed along-with the analysis transaction appended to the blockchain.

11. The method of claim 7, wherein the information pertaining to the data record comprises the data record.

12. The method of claim 9, wherein the information pertaining to the data record includes a memory location within a data structure repository within the initial smart contract on the blockchain.

13. A system for training one or more supervised learning-based algorithms on a blockchain communicably coupled to a server arrangement via one or more data communication networks wherein the blockchain is configured to:
receive a training transaction wherein the training transaction comprises at least one labelled data record and information pertaining to a supervised learning-based algorithm;
execute the training transaction wherein the execution of the training transaction comprises:
invoking at least one smart contract method wherein the at least one smart contract method, when executed, initializes a training of the supervised learning-based algorithm on a set of data records, wherein the standard smart contract method determines a suitably trained supervised learning-based algorithm based on an index table wherein the index table comprises information pertaining to a desired value of precision and recall, and a present value of precision and recall for each supervised learning-based algorithm available on the blockchain;
determining a present value of precision and recall for the supervised learning-based algorithm; and
updating an entry corresponding to the supervised learning-based algorithm in an index table with the present value of precision and recall.

14. The system of claim 13, wherein the blockchain comprises an initial smart contract, the initial smart contract further comprising a plurality of supervised learning-based algorithms.

15. The system of claim 14, wherein each of the plurality of supervised learning-based algorithms is associated with a training repository.

16. The system of claim 14, wherein the labelled data record is stored within a training repository within the initial smart contract of the blockchain.

* * * * *